Jan. 30, 1962 L. A. ATTERMEYER 3,018,696
KEYWAY CUTTING MACHINE
Filed Aug. 8, 1957 8 Sheets-Sheet 1

INVENTOR.
LAWRENCE A. ATTERMEYER.
BY
ATTORNEYS.

Jan. 30, 1962   L. A. ATTERMEYER   3,018,696
KEYWAY CUTTING MACHINE

Filed Aug. 8, 1957   8 Sheets-Sheet 5

INVENTOR.
LAWRENCE A. ATTERMEYER.
BY
ATTORNEYS.

INVENTOR.
LAWRENCE A. ATTERMEYER.
BY
L. W. Wright & H. T. Kaiser
ATTORNEYS.

Fig. 15

United States Patent Office 3,018,696
Patented Jan. 30, 1962

3,018,696
KEYWAY CUTTING MACHINE
Lawrence A. Attermeyer, Cincinnati, Ohio, assignor to The Cincinnati Milling Machine Co., Cincinnati, Ohio, a corporation of Ohio
Filed Aug. 8, 1957, Ser. No. 676,960
5 Claims. (Cl. 90—16)

This invention relates to milling machines and more particularly to a new and improved machine for spline milling and the like.

One of the objects of this invention is to provide a new and improved machine for milling a series of splines or keyways in a shaft or the like automatically in succession.

Another object of this invention is to provide a new and improved milling machine for cutting a series of slots in a work piece at different spacings and of different depths automatically in succession.

A further object of this invention is to provide an automatic machine for keyway slotting shafts and the like having an automatic cycle control mechanism for controlling automatic loading of work in the machine, the feed and rapid traverse mechanism for moving the work relative to the cutter, the feed and rapid traverse mechanism for sinking a cutter to depth in the work, automatically adjustable stop means for limiting the depth of the cutter, and means to automatically unload the work and return the machine parts to starting position.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings in which like reference numerals indicate like or similar parts.

Figure 1:
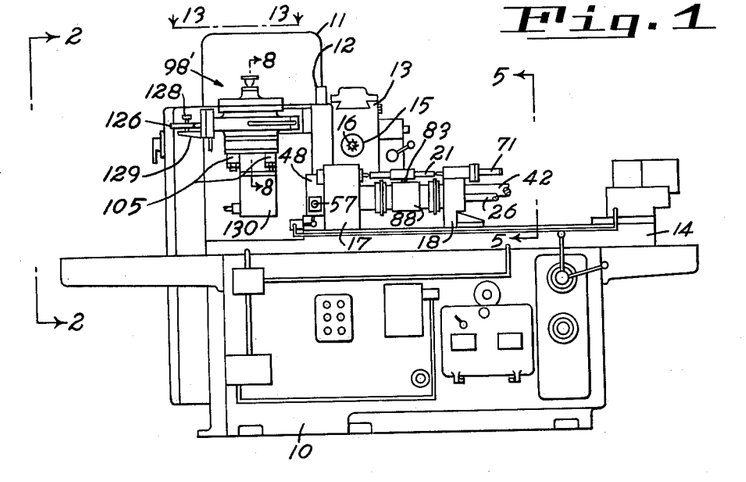
FIGURE 1 is a front elevation of a machine embodying the principles of this invention.

Referring to the drawings and more particularly to FIGURE 1, there is shown a milling machine embodying the principles of this invention in which the reference numeral 10 indicates, in general, the bed of the machine from the rear of which a column 11 extends upwardly having guideways 12 formed thereon for mounting a spindle carrier 13 for vertical movement toward and from a work supporting table 14 horizontally guided on the bed 10. The spindle carrier has a cutter spindle 15 journaled therein which supports a rotatable cutter 16.

Figure 3:
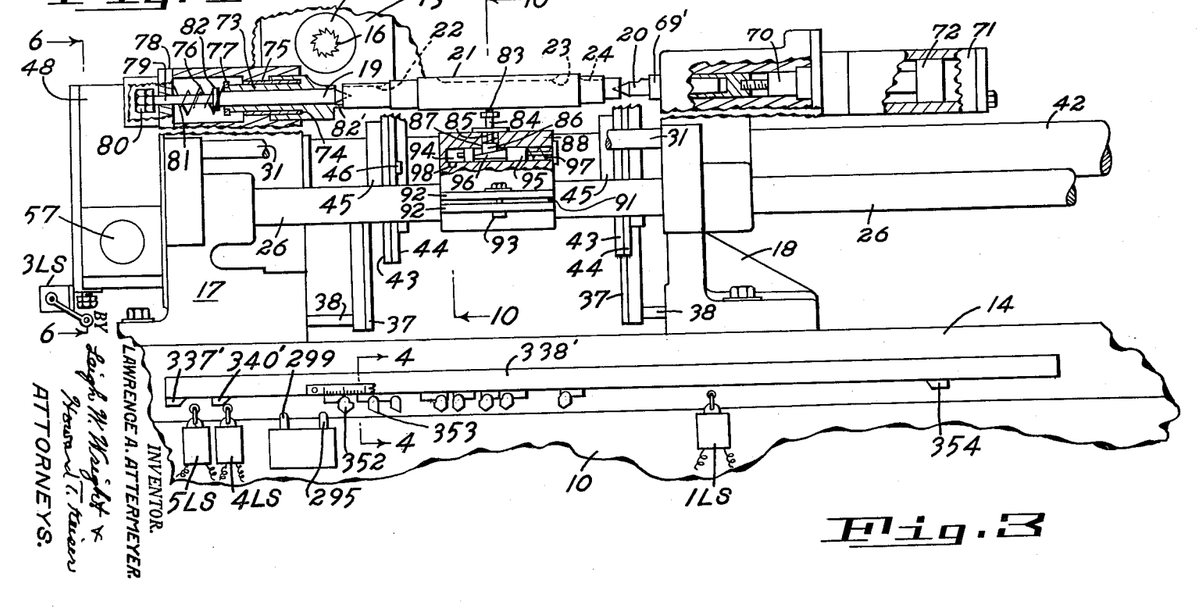
FIGURE 3 is an enlarged front view of the work supporting mechanism.
Figure 4:
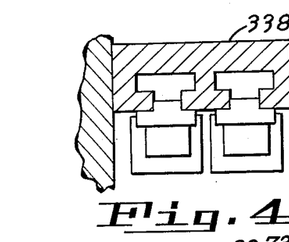
FIGURE 4 is a section on the line 4—4 of FIGURE 3.

The table 14 has mounted thereon a headstock unit indicated generally by the reference numeral 17, and a tailstock unit indicated generally by the reference numeral 18. The headstock unit, as shown in FIGURE 3, has a work supporting center 19, and the tailstock unit has a center indicated by the reference numeral 20. A work piece 21 is shown in FIGURE 3 supported by the centers 19 and 20, but in this machine the work is not rotated on the centers, but is held against rotation so that keyways such as 22, 23, and 24 may be cut therein along one side of the work.

Between the headstock and tailstock there is mounted a work loading mechanism, shown more particularly in FIGURE 5, comprising a loading magazine chute, indicated generally by the reference numeral 25, pivotally mounted and adjustable on a shaft 26, and a delivery magazine chute 27 located below the chute 25. The work pieces 21 roll down the chute 25 upon which they are manually placed by the operator into a work receiving slot 27' formed in an indexible work carrier 28. This carrier has a number of slots, and as the carrier is indexed a work piece is moved from the position 29 to a machining position 30. Further indexing carries the work piece around and deposits it in the delivery chute 27 from which the work is manually removed by the operator.

The loading magazine or chute has one end supported on the shaft 26 and the other end supported on a rod 31 which extends lengthwise from the headstock 17 to the tailstock 18. The floor plate 32 of the chute 25 has an angle bracket 33 welded thereto, and a work carrying rail 34 is attached to the angle bracket by screws 35 which pass through elongated holes 36 in the rail so that the rail may be adjusted up or down in accordance with the diameter of the work and to align the center of the work properly in line with the slot in the indexible carrier.

The delivery chute 27, comprising side rails 37, are pivotally supported on pins 38 and are clamped in angular position by clamping bolts 39 which pass through elongated slots 40 in the rails 37. This also permits the arc 41 to be adjusted relative to the periphery of the indexible carrier to accommodate different diameters of work.

The indexible work carriers 28 are spaced on a shaft 42, and each comprises a pair of plates 43 and 44, as shown in FIGURE 3, which are secured to a hub 45 keyed on the shaft 42. Notches are cut in the periphery of the plates 43 and 44 such as the slot 27', and by providing two plates one can be turned relative to the other to vary the size of the slot 27' to suit the diameter of the work, and then they are secured together by screws 46 which pass through the plates and into the hub 45 as shown in FIGURE 5, one of the plates being provided with an elongated slot 47 as shown in FIGURE 5.

It will thus be seen that the work loading and unloading mechanism, as well as the indexible carrier is adjustable for different diameters of work.

The shaft 42 to which the indexible work carriers are connected extends through the headstock 17 into a housing 48 in which is provided a mechanism for indexing the shaft 42. The indexing mechanism is shown in FIGURE 6 and comprises an index plate 49 which is keyed or otherwise secured to the end of the shaft 42 and adjacent to it, as shown in FIGURE 7, is a gear 50 which is mounted on the shaft 42 and connectible to it by a cam ratchet clutch 50' for imparting rotation thereto during one direction of rotation of the gear 50. Ratcheting takes place during the other direction of rotation of the gear 50. The gear 50 meshes with a rack 51 which is mounted in a slot 52 of a slide member 53 which in this case happens to be a piece of round shafting. The slide member 53 is suitably guided in a hole in a bracket 54 and is connected by a piston rod 55 to a piston 56 slidably mounted in a cylinder 57. Attention is invited to the fact that the rack 51 is freely slidable in the slot 52 and is provided with an elongated slot 58 through which passes pins 59 which form the motion transmitting connection between the rack 51 and the slide 53. The slide 53 is also provided with a flat face 60 to which is secured a cam member 61, as by screws 62, and this cam member has a convex cam surface 63 on one side of it which is adapted to engage a pin 64 in the index plate locking plunger 65 to effect withdrawal of the plunger. The locking plunger is normally held by a spring 66 into engagement with one of a series of index slots 67 formed in the periphery of the index plate 49.

In operation it will be seen that, as the slide 53 moves from its extreme left position, the pins 59 and the cam 63 will move with the plunger until the lost motion in the slot 58 is taken up during which time the cam 63 will withdraw the locking plunger 65 while the index plate 49 and gear 50 remain stationary. A back-up plunger 69 having a beveled end remains in a slot 67 to hold the parts against rotation until the pin 59 picks up the rack 51 and starts rotation of gear 50 and the indexible shaft 42. The cam 63 will also continue its movement and allow the locking plunger to ride on the periphery of the index plate until it eventually enters the next slot therein and stops the indexing movement. The back-up plunger 69 will also enter the next slot so that upon return movement of the plunger 53 and ratcheting of the gear 50 there will be no retrograde movement of the index plate and shaft. The indexing movement of the shaft 42 moves a new work piece in position between the centers 19 and 20.

After a new work piece is positioned in a slot supported by the indexible work carriers 28, the tailstock center 20 is advanced to engage the end of the work piece. The center 20 is mounted in a hollow sleeve 69', FIGURE 3, which is slidably mounted in the tailstock housing 18 and operatively connected to the end of a piston rod 70 which extends into a cylinder 71 where it is provided with a piston 72. Admittance of fluid pressure to cylinder 71 advances the tailstock center 20 which engages the end of the work piece and pushes the work toward the headstock center 19. The headstock center 19 is surrounded by a sleeve 73 which has a shoulder 74 formed on one end thereof and engageable with the end of a fixed sleeve 75 mounted in the headstock housing 17. When there is no work piece on the center, the sleeve 73 is pushed forward by a spring 76 interposed between a washer 77 located on the end of the sleeve and the fixed wall 78. This pushes the sleeve 73 to the right relative to the center 19 which is normally held in a substantially fixed position. This is accomplished by reducing the end 79 of the center and extending it through the wall 78 where its exposed end is provided with a pair of lock nuts 80. A spring 81 is interposed between the wall 78 and a washer 82 mounted on the portion 79 whereby the center 19 is held toward the right with the lock nuts 80 acting as a stop means. The end of the sleeve 73 is provided with a pair of ears 82' which are engaged by the work piece as it moves toward the left, and as the sleeve 73 is pushed toward the left it uncovers the center 19 and the work is pushed on to the center 19 until the shoulder 74 engages the end of the fixed sleeve 75. The object of the sleeve 73 is to push the work off of the center 19 after the cutting operation, and it will be obvious that when the tailstock center is retracted the sleeve 73 will move toward the right and relative to the center 19 to reposition the work on the indexible carrier so that it will clear the end of the center 19 when the indexible work carrier moves the work laterally on its indexing movement.

Figures 10, 12:
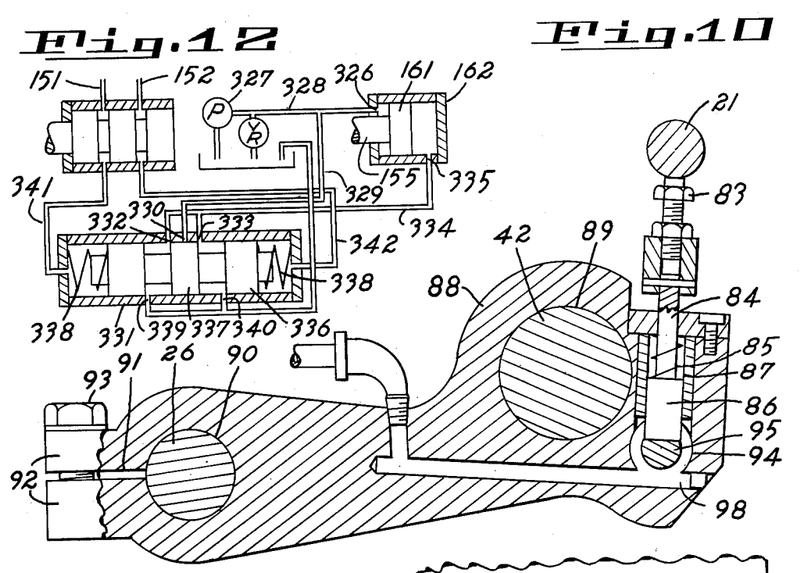
FIGURE 10 is a section on the line 10—10 of FIGURE 3.
FIGURE 12 is a diagrammatic view of the backlash eliminating control circuit.

After the work has been clamped between the centers, a jack 83, shown in FIGURES 3 and 10, is provided underneath the work piece in between the centers to support the center of the work and simultaneously provide sufficient friction to hold the work piece against rotation. The jack 83 is in the form of a plunger having a reduced portion 84 which is surrounded by a spring 85 that normally acts to retract the jack. An enlarged portion 86 is slidably mounted in a bore 87 formed in a housing 88. The housing 88 has an enlarged bore 89 by which it is supported on the shaft 42, and is provided with a second bore 90 which fits the shaft 26. The end of the housing is split at 91 which intersects the bore 90, thus providing a pair of clamping ears 92 by which the housing may be clamped in some longitudinal position on the shaft 26 by clamping bolts or the like 93. The vertical bore 87 intersects a horizontal bore or cylinder 94 in which is slidably mounted a piston 95. The end of the plunger 86 is cut at an angle to engage a wedge 96 formed in the surface of the piston 95. The piston 95 is normally urged toward the left by a spring 97, and it is the force of this spring that urges the plunger 86 against the resistance of spring 85 into engagement with the work, and therefore it should be a moderate force so as not to put so much strain on the work piece that it would cause the work piece to bend.

One end of the cylinder 94 is provided with a hydraulic connection 98 whereby hydraulic pressure may be admitted to the end of the cylinder to cause retraction of the piston 95 and thereby retraction of the jack 83. When the pressure is released, the spring 97 urges the plunger 95 to the left and thereby raises the jack 83 into engagement with the work.

After the work piece is securely clamped in position on the work table, the various keyways are cut by lowering the spindle carrier and thereby the cutter to the right depth, depending on the diameter of the work at the particular place where the keyway is to be cut, and also the depth of the keyway itself. The lowered position of the carrier, and thereby the cutting position of the cutter is determined by a positive turret stop mechanism indicated generally by the reference numeral 98' shown in FIGURE 1. This mechanism is mounted on a bracket 99, FIGURES 9 and 13, which is integral with the spindle carrier 13 and therefore is movable up and down therewith. This mechanism includes a turret plate 100, FIGURE 8, which is detachably connected by a key 101 to a second plate 102 which is keyed at 103 to a shaft 104. The plate 100 has a number of stop members 105 threaded therein and projecting therefrom, the number of stop members depending upon the number of times that the carrier is lowered to cutting position in one cycle of the machine. In the present case, there are four stops and if a different number of stops is desired the plate 100 is removable and a different plate substituted having the desired number of stops threaded therein.

Figure 8:
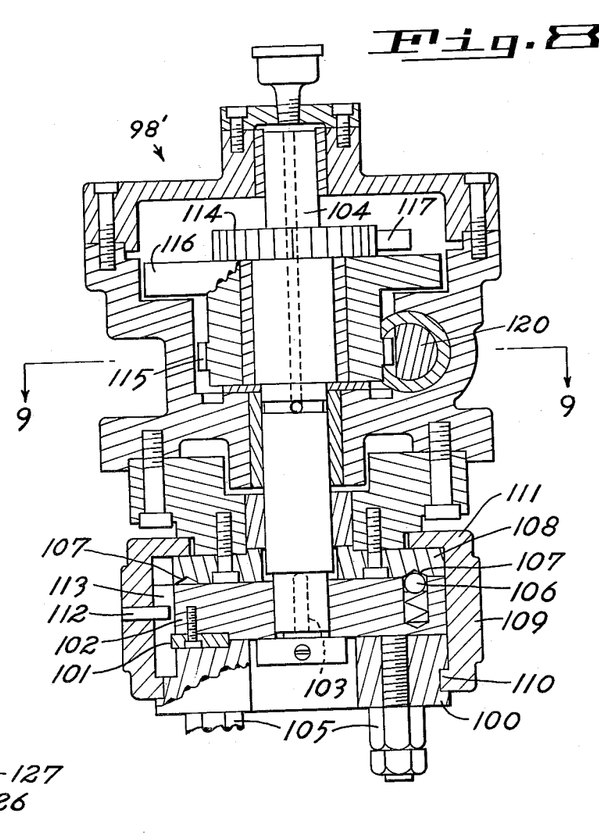
FIGURE 8 is a section on the line 8—8 of FIGURE 1.

The plate 102 is provided with a spring pressed detent 106 engageable with suitably located depressions 107 formed in a fixed part 108 of the housing. The plate 100 is held in position by a ring 109 having a notched lower flange 110 and an upper internal flange 111 by which it is supported on the fixed member 108. The ring 109 has a pin 112 which engages a groove 113 formed in the periphery of the plate 102 whereby the ring 109 will rotate with the turret stop plate 100.

Figure 2:
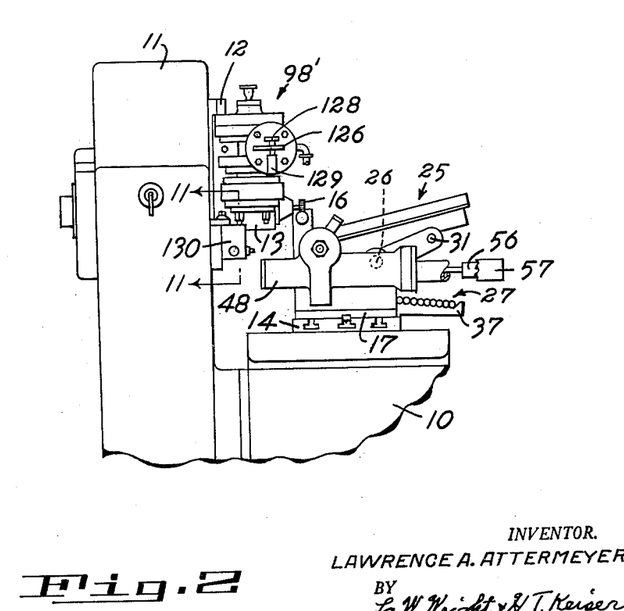
FIGURE 2 is an end elevation of the machine as viewed from the left of FIGURE 1, on the line 2—2.
Figure 13:
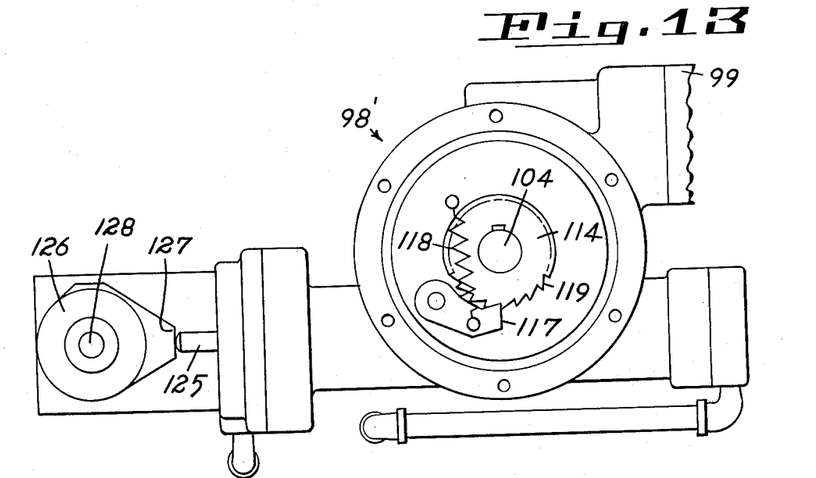
FIGURE 13 is a detail plan view partly in section on the line 13—13 of FIGURE 1.

The shaft 104 is suitably journaled in the fixed part of the housing, and at the upper end is provided with a ratchet plate 114. A gear 115 surrounds the shaft 104 for free rotation relative thereto, and the upper end of the gear is provided with a flange 116 which carries a ratchet pawl 117, FIGURE 13. The ratchet pawl is held in engagement with the periphery of the ratchet 114 by a spring 118. It will be noted that the ratchet teeth 119 are so located, that, upon rotation of the gear and pawl carrier plate, the shaft will be rotated in one direction only and that the opposite direction of movement is a ratcheting movement. The gear 115 engages a rack 120 which has piston portions 121 and 122 formed on opposite ends and slidable in a cylinder 123 formed integral with the housing. When the piston and rack move toward the right as viewed in the drawings an indexing movement is effected. When the piston and rack move toward the left, a ratchet movement is effected. In order to determine the angle of rotation of a particular indexing movement, a stop mechanism has been provided to determine the number of indexing movements in one complete rotation of the indexible shaft. To this end, the cylinder 123 is provided with an independent piston 124 having a piston rod or plunger 125 projecting from the end of the cylinder and adapted to engage a stop plate 126 (FIG. 13). This stop plate has a number of surfaces such as 127 located around its periphery and at different radii from its center and by rotatably positioning this plate the stroke of the rack may be determined. The plate 126 is mounted on an adjustable clamping bolt 128 which is threaded in a bracket 129, FIGURES 1 and 2, projecting from the housing.

Figure 11:
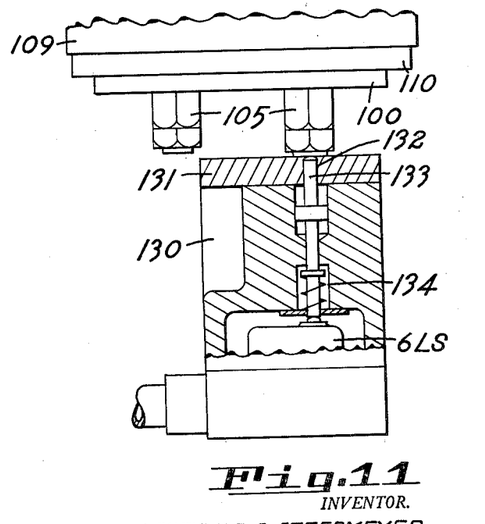
FIGURE 11 is a section on the line 11—11 of FIGURE 2.

The downward movement of the spindle carrier is stopped by engagement of one of the stops 105 with a positive stop member 130, FIGURE 11, which is bolted to the column of the machine. This is in the form of an angle bracket housing and the anvil 131 which is engaged by the stop 105 is large in area but has a small hole 132 in the center through which extends a switch actuating pin 133. This pin is held protruded by a spring 134 and when the pin is depressed it operates a limit switch indicated generally by the reference numberal 6LS. The switch 6LS thus indicates that the carrier has moved down to its correct position and signals the next step in the automatic cycle of the machine.

The transmission for moving the table is of the conventional type that provides feed and rapid traverse rates in opposite directions, and the transimission shown in Patent No. 1,969,231 is suitable for present purposes. Based on the principle of that transmission in which four gears may be selectively utilized to provide feed right, feed left, rapid traverse, and rapid traverse left, there is shown diagrammatically in FIGURE 16 four gears 136, 137 which may be designated as the feed right and feed left gears respectively, and gears 138 and 139 which may be designated as the rapid traverse right and rapid traverse left gears respectively. The source of power for driving this transmission is diagrammatically indicated by the gear 140 which drives the gear 141 mounted on the end of a rapid traverse shaft 142 upon which the gears 138 and 139 are mounted for free rotation.

Figure 16:
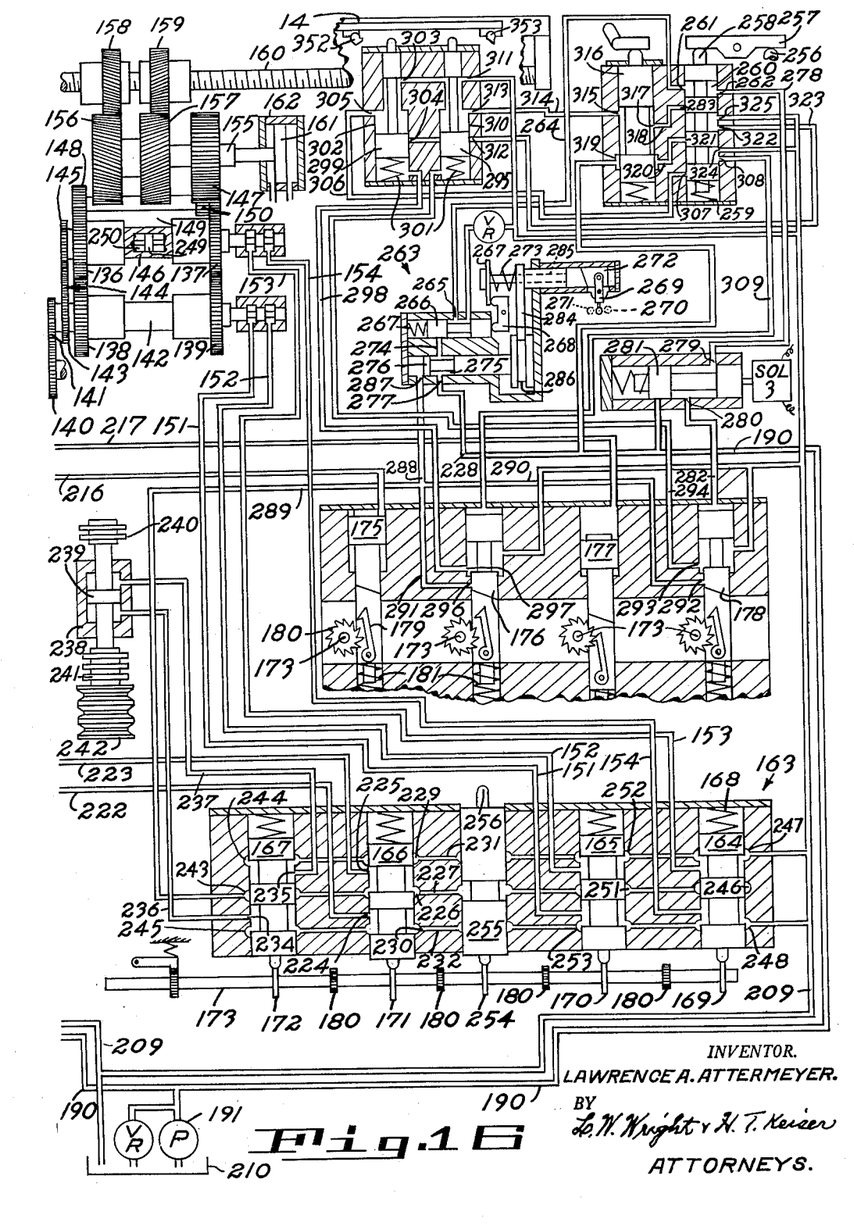

The gear 141 also drives the gear 143 which is connected by a suitable variable speed transmission, such as change gears represented generally by the reference numeral 144, to the final gear 145 mounted on the feed shaft 146 which supports the gears 136 and 137 for free rotation. The gear 137 meshes directly with a final output gear 147 while the gear 136 is reversely connected to the gear 147 by an idler gear 148 which meshes with the gear 136, and shaft 149 and a second idler gear 150 mounted on the shaft 149 and meshing with the gear 147.

It will now be seen that the shafts 142 and 146 are continuously driven by the drive gear 140, and it is only necessary to selectively clutch in one of the four gears to their respective shafts in order to drive the gear 147 at different rates and in different directions. The clutching is accomplished by conventional hydraulic clutches and separate hydraulic power lines are provided for the actuation of the clutches, such as the lines 151 and 152 for the rapid traverse clutches and the lines 153 and 154 for the feed clutches. The gear 147 is mounted on a shaft 155 which carries a pair of opposite spiral gears 156 and 157 which mesh respectively with gears 158 and 159 mounted on the table feed screw 160. These last-named gears constitute a backlash eliminator, and the shaft 155 is connected to a piston 161 mounted in a cylinder 162 for rendering the backlash eliminator active or inactive. This backlash eliminator is the same as that shown in Patent No. 2,070,807.

The four hydraulic lines 151, 152, 153, and 154 are connected to an automatic cycle control valve mechanism indicated generally by the reference numeral 163 in FIGURE 16 in the form of a cycle control box having mounted therein four control valve plungers 164, 165, 166, and 167, and these plungers are all urged by individual springs, such as 168, into engagement with cams 169, 170, 171, and 172, respectively, which are secured to an indexible control shaft 173. The general arrangement of this automatic control valve mechanism is the same as that shown in Patent No. 2,365,043, issued December 12, 1944.

The automatic cycle operation of the machine is controlled by the shaft 173, and, for the purposes of this invention, the shaft 173 has 17 stations, and mechanism is provided for indexing the shaft to each one of these stations.

This mechanism comprises four hydraulically actuated indexing plungers 175, 176, 177, and 178 which are slidably mounted in the box, and each carries a ratchet pawl 179 for cooperation with a ratchet wheel 180 which are mounted on the shaft 173. All of these plungers are held by a spring such as 181 in their upward position, and actuation of any one of these plungers will cause rotary indexing of the cam shaft 173.

Figure 15:
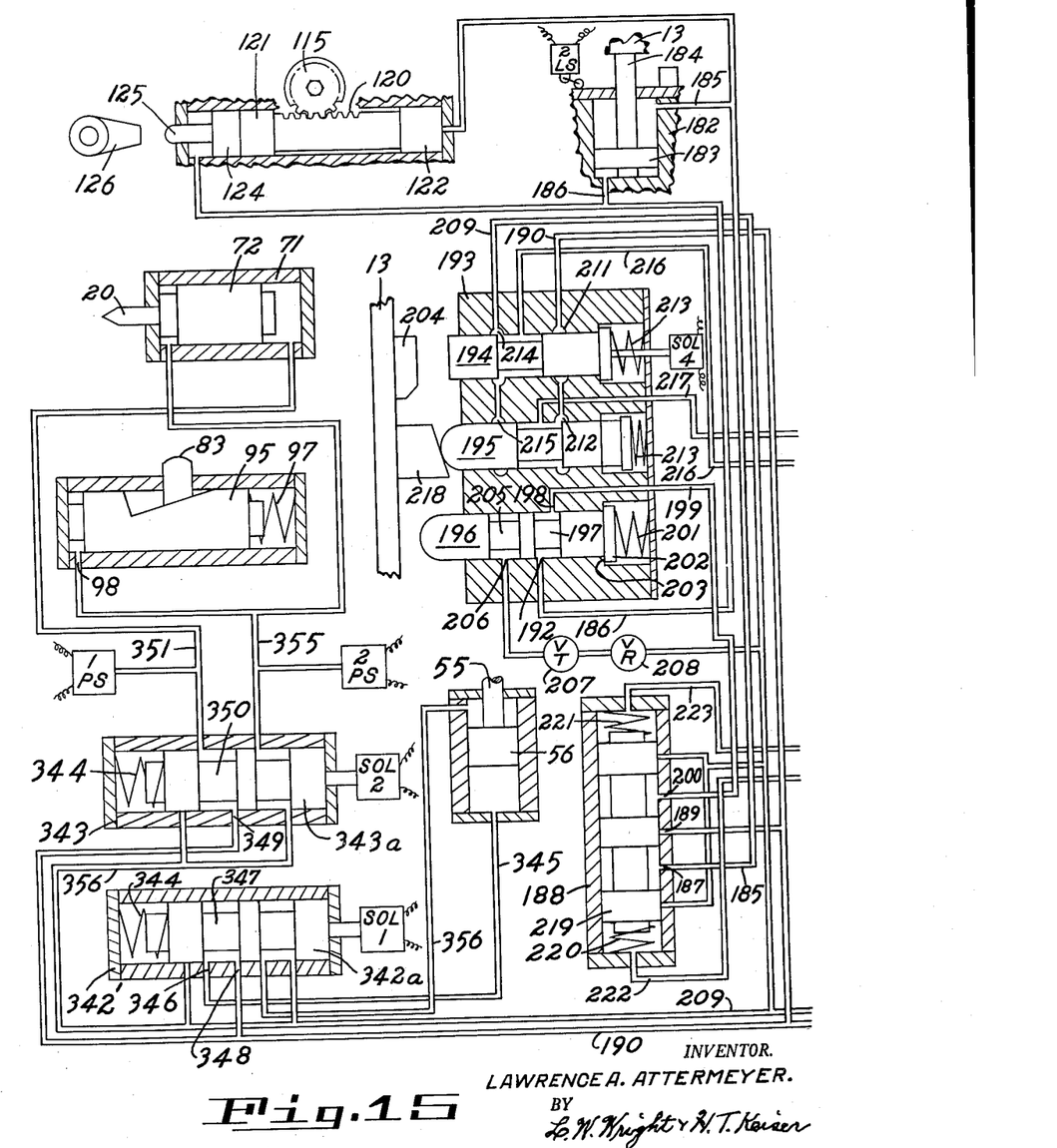
FIGURES 15 and 16 are diagrams of the hydraulic control circuit.

The cutter spindle carrier 13 is moved up and down by hydraulic means comprising a cylinder 182, FIGURE 15, which is fixed to the column 11 of the machine, and a piston 183 which is connected by piston rod 184 to the carrier 13. As shown in the hydraulic diagram, the cylinder has channels 185 and 186 connected to opposite ends thereof.

The channel 185 is connected directly to port 187 of a reversing valve 188 which has the pressure port 189 connected to the pressure supply line 190 which is supplied by a pump 191 (FIG. 16). The channel 186 is connected to port 192 of a valve control block 193 which is fixedly mounted on the column adjacent the spindle carrier 13. This valve block has three valve plungers 194, 195, and 196 slidably mounted therein. The valve plunger 196 is a feed-rapid traverse selector valve, and has a groove 197 which normally connects the port 192 to port 198 which, in turn, is connected by channel 199 to port 200 of the reverse valve 188. A spring 201 normally holds the valve plunger 196 in the position shown with the aid of a flange 202 engaging an abutment 203 formed in the valve block. When the spindle carrier 13 is moving down to enter a cut, a dog 204 on the carrier engages the end of plunger 196 and shifts it to the right so that a second valve groove 205 in the plunger interconnects the port 192 to port 206. The return fluid from the cylinder 182 will now be interconnected to a feed rate control valve 207 which may be manually adjusted to determine the downward rate of cutter feed into the work.

In series with the feed rate valve 207 is a low pressure relief valve 208 which connects the throttle valve 207 to the reservoir line 209 whereby the exhaust fluid will return to the reservoir 210 from which the pump 191 draws its supply as shown in FIGURE 16. It will now be seen that when the plunger 196 is in the position shown and pressure port 189 of the reverse valve 188 is interconnected to port 200, the fluid pressure will flow from port 198 to 192 and thereby to the bottom of the cylinder 182 to elevate the carrier. When the reversing valve 188 interconnects port 189 to port 187 the fluid pressure will flow directly to the top of the cylinder 182 to effect downward movement of the carrier at a rapid traverse rate until the plunger 196 is shifted to the right by the dog 204 whereby the movement of the carrier will be changed automatically to a feed rate.

The valve plungers 194 and 195 in the valve block 193 are for the purpose of indexing the control box, and the pressure channel 190 is connected in series to the ports 211 and 212 respectively of the valves 194 and 195. These valves are normally held extended to the left by springs 213. The valve exhaust ports 214 and 215 are connected in series to the reservoir line 209. It will now be seen that when the valve plunger 194 is moved to the right it will interconnect the pressure port 211 to channel 216, and that when the valve plunger 195 is shifted to the right it will interconnect port 212 to channel 217. These two channels are connected to indexing plungers, the channel 216 being connected for actuation of the indexing plunger 175, and the channel 217 being connected for actuation of the indexing plunger 177.

The plunger 195 is actuated by a dog 218 when the carrier has reached the upper end of its travel. The valve plunger 194, rather than being operated by a dog, is operated by a solenoid, and this solenoid is energized at the end of the downward movement of the carrier and controlled by the switch 6LS in the turret stop mechanism shown in FIGURE 11, which insures that the carrier is all the way down before the table starts to feed.

The reversing valve 188 has a plunger 219 which can be held in a centralized position by centralizing springs 220 and 221. Shifting of the valve plunger 219 is controlled by a cam in the cam control box and to this end the opposite ends of the valve 188 are connected by channels 222 and 223 to ports 224 and 225 of valve plunger 166, the position of which is controlled by the shape of the cam 171.

The valve 166 has a pressure port 226 which is connected to a pressure groove 227 which extends throughout the valve block 163. The valve also has a pair of exhaust ports 229 and 230 which are connected to grooves 231 and 232 which extend the length of the valve block 163 and are connected to the exhaust line 209. It will now be apparent that raising or lowering of the valve plunger 166 with respect to a center position will cause the spindle carrier to raise or lower.

The valve control box 163 also has a valve plunger 167 which is operated by cam 172 for controlling rotation of the cutter spindle. This valve has ports 234 and 235 which are connected by channels 236 and 237 to a cylinder 238. This cylinder has a piston 239 which is movable in one direction to apply a brake 240 and simultaneously disconnect a clutch 241 to stop rotation of the cutter spindle drive pulley 242. Movement of the piston in the opposite direction will release the brake and connect the clutch. This is conventional structure and therefore is only illustrated diagrammatically. The valve 167 has a pressure port 243 and exhaust ports 244 and 245 whereby it will be understood that raising or lowering of the valve plunger 167 by the cam 172 is capable of automatically starting and stopping the cutter spindle.

The clutches for the various transmission gears of the table transmission are controlled by valves 164 and 165 as previously set forth. The valve 164 controls admission of fluid selectively to channels 153 or 154 by connecting the pressure port 246 to one of the channels and connecting the other one to one of the exhaust ports 247 or 248. It will be understood that the clutches for the gears 136 and 137 are alternately connected by a piston 249 slidably mounted in a cylinder 250 mounted in the shaft 146 in accordance with conventional practice. The valve plunger 165 which controls the clutches to gears 138 and 139 also has a pressure port 251 and exhaust ports 252 and 253 for alternately connecting pressure to channels 151 or 152 and thereby actuating a piston for operation of clutches for connecting the gears 138 and 139 to the drive shaft 142 in a similar manner.

Attention is invited to the fact that the shaft 173 has a neutral or stop position after each revolution of the shaft, which corresponds to a full cycle of the machine, and this means that all of the control cams on the shaft are in such a position that all moving parts of the machine are stopped, whereby there is no part that is moving which could be utilized to automatically cause indexing of the shaft 173 and therefore the shaft 173 would normally have to be indexed by the operator to start the machine. To this end, shaft 173 is provided with a control cam 254 which is located opposite a starting control plunger 255, and this cam has a single notch in its periphery whereby the plunger 255 is normally held in a raised position throughout the cycle and at the end of the cycle the plunger drops into the notch of the cam 254. The upper end 256 of the plunger 255 is shown in the upper right hand corner of FIGURE 16 and engages a centrally pivoted lever 257 which engages the end of a control valve plunger 258 which is held in engagement with the lever by a spring 259, which spring through the lever 257 normally urges the control plunger 255 into engagement with the cam 254.

When the plunger 255 is in its stop position, the plunger 258 is in its raised position, which is that shown in the drawings. The valve plunger 258 has a groove 260 which is in the position to connect port 261 to port 262 and thereby hydraulically interconnect the indexing plunger 178 to a starting control mechanism indicated generally by the reference numeral 263. The port 261 is connected by channel 264 to port 265 of a control valve 266 which is normally held in the position shown by the spring 267. A pivoted crank 268 is interposed between the end of the valve 266, and a flange 267 on the end of an operating rod 272. The rod is operatively connected to a control lever 269 which has a central position as shown, an automatic control position 270, and a manual control position 271 on either side thereof.

When the lever is moved to the manual control position 271 it pulls the rod 272 to the right against the resistance of a spring 273, thereby oscillating the crank 268 and shifting the valve 266 to the left, thereby interconnecting the port 265 with port 274 which is connected by a groove 275 in a valve 276 to a pressure port 277. The pressure port 277 is connected at 228 to the pressure supply line 190. This results in admission of pressure to port 265 and channel 264 and thereby through interconnected ports 261 and 262 of valve 258 to channel 278 which is connected at this time through interconnected ports 279 and 280 of valve 281 to channel 282. Channel 282 is connected to the end of the ratchet plunger 178 which will cause downward actuation thereof to index the shaft 173.

When the shaft 173 is indexed, it causes the cam 254 to raise the plunger 255 and thereby causes the valve 258 to disconnect the port 261 from port 262 whereby the valve groove will connect the port 262 to port 283. The reason for this is to prevent the operator from effecting a second actuation of the lever 269 and thereby a second indexing of the shaft 173 before the completion of the operation set up by the cam shaft 173 and thereby causing a possible wreck of the machine. After the indexing, as just described, the operator moves the control lever 269 to the automatic position 270 which thereby moves a shifter fork 284 supported by the sleeve 285 slidably supported on the rod 272, said fork engaging a groove 286 formed in the end of a flange integral with the end of the valve 276. This shifts the valve 276 to the left and interconnects port 277 to port 287. Fluid pressure is now supplied to channel 288 which has a branch 289 leading to the pressure groove 227 of the valve control block 163. This results in the connection of pressure to channel 227 and initiates operation of the first step in the cycle of the machine. It should be noted that even although the shaft 173 was indexed to its first cycle control position by the ratchet plunger 178, nothing happened until pressure was connected to the groove 227 by the automatic cycle control lever 269.

The channel 288 also has branches 290 and 291 leading to index plungers 178 and 176 respectively. The channel 290 terminates in port 292 which is connected, when the plunger 178 is depressed, to port 293, and channel 294 connected thereto, to the bottom of a dog operated plunger 295. Likewise, the channel 291 terminates in port 296 which is connected upon depression of plunger 176 to port 297 and channel 298 to the bottom of a second dog operated plunger 299. The plungers 295 and 299 are adapted to be depressed by trip dogs, such as 352 and 353 carried by the table as shown in FIGURE 3.

The idea of connecting pressure to the bottom of these plungers is to insure that they are in a raised position and to squeeze out any oil that might be trapped in the bores in which they slide, even although normally held in a raised position by springs 301. The bore 302, in which the plunger 299 slides, has an exhaust port 303 and pressure port 304 and a port 305 which is connected by channel 306 to port 307 of valve 258. When the valve plunger 258 is held in its normal depressed position, the port 307 is connected to port 308 and thereby through channel 309 to index plunger 176.

Likewise, the bore 310 in which the dog operated trip plunger 295 slides, has an exhaust port 311, a pressure port 312 and an intermediate port 313 which is connected by channel 314 to port 315 of a manually controlled reset plunger 316. The port 315 is normally connected to port 317 and thereby through channel 318 to port 283, which, as previously described, is connected to port 262 and thereby through channel 278 to the indexing plunger 178. It should, therefore, be apparent that upon actuation of the trip plunger 299 that the index plunger 176 will be actuated to index the shaft 173; and that upon operation of the trip plunger 295, the index plunger 178 will be operated to index the shaft 173. There are a number of dogs on the table which are properly positioned to effect indexing of the shaft 173 to start the next step in the cycle. It should, therefore, be apparent that the indexing plungers 175 and 177 are actuated by the spindle carrier as the moving member, and that the plungers 176 and 178 are actuated by the table as the moving member, and since the carrier and the table never move together, that is, at the same time, each time the shaft 173 is indexed it will stop the movement of one and initiate the movement of the other.

The reset plunger 316 has a pressure groove 319 which is connected by channel 320 to port 321 of valve 258. When the valve plunger 258 is in its normally depressed position during operation of the machine, the port 321 is connected to port 322 and thereby to channel 323 which supplies fluid pressure to ports 312 and 304 of the table trip plungers 295 and 299. When the valve plunger 258 is in its raised position at stoppage of the machine, the ports 308 and 322 are connected to the exhaust ports 324 and 325.

The elimination of backlash from the driving gears 158 and 159 is controlled by the piston 161 which is slidably mounted in the cylinder 162. Automatic operation of backlash elimination is shown in FIGURE 12 wherein it will be seen that a source of pressure is continuously connected at 326 to one end of the cylinder 162 to effect backlash elimination. As diagrammatically illustrated, the port 326 is shown supplied with pressure by pump 327 and channel 328 which has a branch line 329 leading to port 330 of an automatic backlash control valve 331. This valve has two ports 332 and 333 located on opposite sides of pressure port 330, and both connected to channel 334 which leads to port 335 in the other end of the backlash cylinder 162.

The valve plunger 336 of the valve 331 has a central spool 337 which is normally held in a central position as by springs 338 to centralize the spool 337 between the ports 332 and 333. The valve also has exhaust ports 339 and 340 to which the ports 332 and 333 are normally connected. It will now be obvious that no matter which direction the valve plunger 336 is shifted, pressure will be connected to the port 335 of the backlash cylinder 162. It will be noted that the piston 161 is a differential piston because of the piston rod 155 attached to one end, so that even although pressure is continuously connected to the port 326 and thereby to one side of the piston 161, whenever the same pressure is connected to the port 335 the larger area of the piston 161 will be subjected to the same pressure so that the piston 161 will be moved to the left to remove the effect of the backlash eliminator.

The automatic shifting of the valve plunger 336 is controlled from the pressure conditions in channels 151 and 152 which control rapid traverse movement of the table as previously described. As shown in this FIGURE, the channels 151 and 152 are connected by extensions 341 and 342 to opposite ends of the valve 331. Therefore, no matter which one of the channels, 151 or 152, is under pressure, the valve plunger 336 will be shifted to connect pressure to the cylinder 162 and remove the effect of the backlash eliminator.

*Operating cycle*

This machine is designed for continuous repeating cycles of operation but, as previously described, the cycle control mechanism makes a complete revolution through a series of index movements for each complete cycle. The indexing angles are equal, and at each station at the end of each indexing movement, a predetermined function is performed, and therefor each cam has a predetermined number of functional points or stations around its periphery. One of these functional points is a cycle stop. The center cam 254 is a circular cam with a single notch in its periphery as explained, and the positioning of this notch opposite the control plunger 256 determines the angular stop position of the shaft 173 and the remaining cams are keyed to the shaft in proper angular position whereby stop points on all the cams are aligned in the same radial plane of shaft 173. When the cycle control cams are in this stop position, the table is at its extreme right hand position as shown in FIGURE 3, and the spindle carrier 13 is in its raised position. In order to start the machine, the operator presses the start button 336' shown in the electrical control circuit, FIGURE 14. This button is in series with a limit switch 5LS which is normally held in a closed position, and, as shown in FIGURE 3, is simply a safety switch or emergency stop in case the table should overtravel during its movement to the right.

Figure 14:
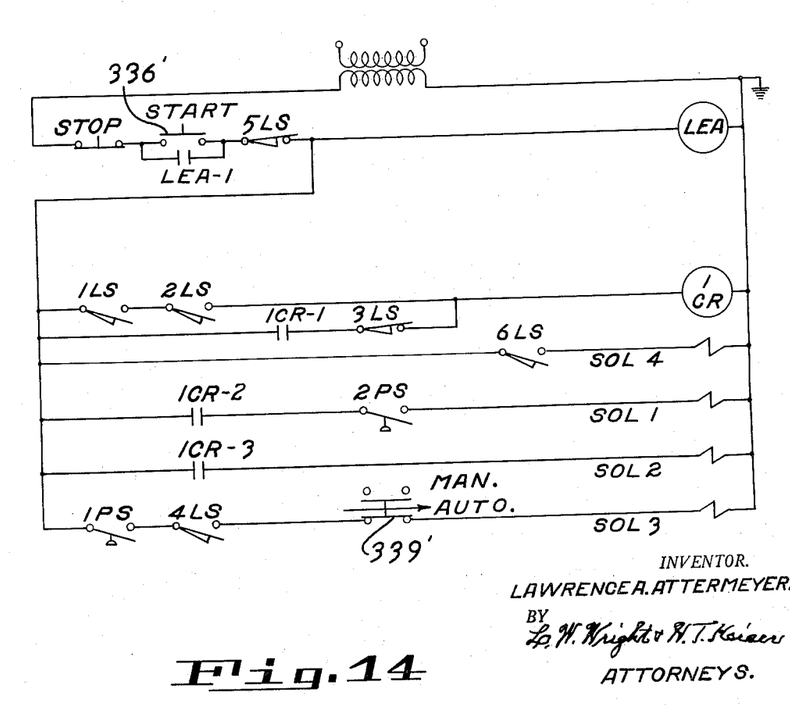
FIGURE 14 is a diagram of the electrical control circuit.

A trip dog 337' is mounted on the dog rail 338' and attached to the front of the table for opening the limit switch 5LS. Since this limit switch is normally closed, the operation of the start button will energize relay LEA and thereby close its latching contact LEA-1 around the start button 336'. This will energize the remainder of the electrical control circuit. The relay LEA will also close a circuit, not shown, for energizing the hydraulic pumps to supply pressure in the hydraulic circuit, and with the control switch 339' in the "Manual" position, the operator utilizes the control lever 269 to effect operation of the index plunger 178 to index the shaft 173 to its first functional position. At this time the limit switch 4LS is held closed by a dog 340', and the pressure switch 1PS is held closed but the switch 339' being open, solenoid 3 will not be operated at this time. After the machine has started, however, on its cycle, and the dog 340' has left the limit switch 4LS, which will now open, the operator may move the switch 339' to the "Auto" position whereby upon completion of one machine cycle, and the return of dog 340' into engagement with the limit switch 4LS, solenoid 3 will be operated to shift the valve 281 and automatically connect pressure to the indexing plunger 178 to automatically start the next machine cycle whereby the machine will continuously repeat its automatic cycle.

Thus, in starting, the operator presses the start button, moves the control lever 269 to its automatic position which connects pressure to the pressure grooves of all of the control cam valves in the cycle control box and moves the control switch 339' to the "Auto" position. Fluid pressure will flow in the appropriate channels which in this first position will result in rotation of the cutter spindle and cutter, and rapid traverse movement of the table toward the left as viewed in FIGURE 3.

Since the reloading of the work fixture occurs during the latter part of the cycle it will be assumed that a new work piece is properly secured in the machine preparatory to cutting keyways therein. This means that the plungers 342a and 343a of control valves 342' and 343 are held in their normal position as shown in FIGURE 15 by springs 344. The control valve 342' controls the work indexing piston 56 which should be held in its advanced position by pressure in line 345. This line is connected to port 346 of valve 342', and the groove 347 in valve plunger 342a is so positioned as to connect the port 346 to the pressure port 348.

The valve 343 controls the operation of the tailstock center 20 and the work rest 83, and this valve has a pressure port 349 which is connected by groove 350 in plunger 343a to channel 351 which thereby supplies pressure to tailstock piston 72 which holds the work in the machine. Channel 351 is also connected to pressure switch 1PS which is thereby held closed so long as pressure is maintained in channel 351. In this first position of the control shaft 173, the cams 169 and 170 position their respective control valves to effect rapid traverse movement of the table to the left. During this movement, a suitable dog, such as 352, on the table engages a trip plunger, such as 295, to effect indexing of the shaft 173 to its next position which causes the came 170 and 169 to suitably reposition the clutches in the table transmission to change the rapid traverse rate to a feed rate.

Figure 9:
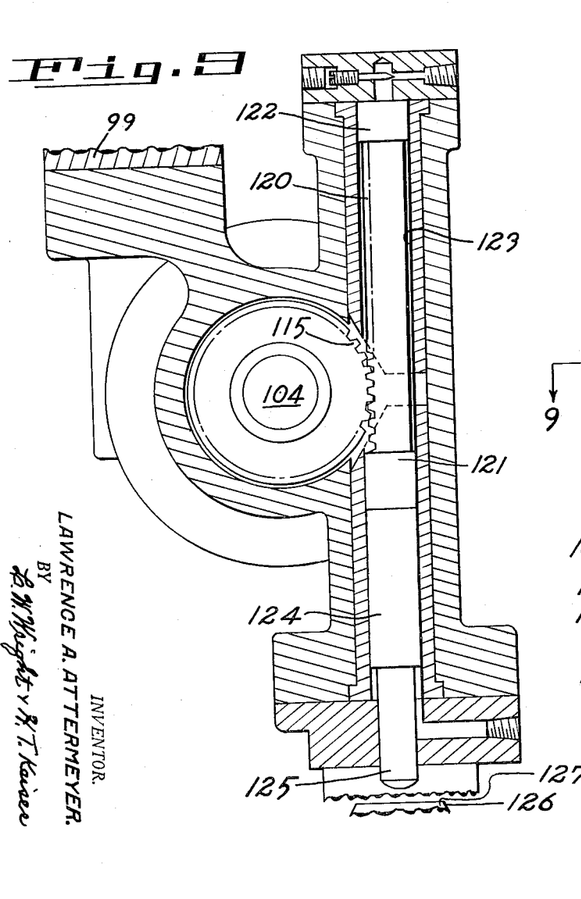
FIGURE 9 is a section on the line 9—9 of FIGURE 8.

This permits the table to move at a slow rate in positioning the end of the work piece beneath the cutter 16 and when this has been accomplished another dog, such as 353 engages a trip plunger to index the shaft 173 and cause the table to stop and simultaneously start shifting of the spindle carrier control valve plunger 219 to initiate downward movement of the spindle carrier. At the same time, the turret stop mechanism shown in FIGURES 8, 9, and 11, is indexed to position the proper stop to control the depth of cut.

As the spindle carrier moves down, the feed control dog 204 automatically changes the rate of the downward movement to a feed rate, so that the cutter 16 properly cuts to depth without breaking the cutter. The completion of the downward movement of the spindle carrier operates a limit switch 6LS shown in FIGURE 11, which is a signal that the cutter has reached its depth and, as shown in the electrical diagram, FIGURE 14, energizes solenoid SOL$_4$. This solenoid, as shown in FIGURE 15, operates the valve plunger 194 and causes another indexing of the shaft 173. This initiates a feeding movement of the table to the left to cut the keyway 22 as shown in FIGURE 3.

After the table has traveled the necessary distance to cut the keyway, another control dog on the table operates one of the trip plungers to index the shaft 173. This stops the movement of the table and initiates raising of the spindle carrier with the result that the limit switch 6LS opens and solenoid 4 is deenergized. When the carrier reaches the end of its upward movement the dog 218 actuates the plunger 195 and causes another indexing of the shaft 173. This time the table rapid traverses to the left to position the work in its next cutting position, and to insure that the table stops in the correct position, the rate is reduced to a feed rate, and another dog on the table effects the next indexing movement which stops the table and initiates the next downward movement of the spindle carrier.

The same automatic procedure is followed in cutting the keyway 23 and then a positioning movement is effected, and then the carrier is moved down to cut the keyway 24. As the last keyway 24 is being cut, the table is traveling at a feed rate toward the left, and as it completes its movement a dog on the table effects indexing of the shaft 173 and, at the same time, a dog 354 on the table actuates limit switch 1LS. At this point the table stops and the spindle carrier is raised, and upon completion of its elevation, it actutaes limit switch 2LS. As shown in the electrical diagram, FIGURE 14, the simultaneous closing of 1LS and 2LS energizes the relay 1CR which closes its latching contact 1CR-1. The limit switch 3LS shown on the electrical diagram is a normally closed switch and has been so held throughout the cutting cycle. Therefore, when 1CR-1 is closed, the relay 1CR is energized which closed contacts 1CR-2 and 1CR-3 respectively in series with solenoid SOL$_1$ and SOL$_2$. Solenoid 2 will be energized first because the pressure switch 2PS in series with solenoid 1 is open. As shown in the hydraulic diagram, FIGURE 15, solenoid SOL$_2$ will shift the valve plunger 343A to the left and thereby connect pressure to channel 355 and connect channel 351 to the reservoir line 356. This will cause retraction of the tailstock center 20 whereby the spring actuated sleeve 73 around the headstock center 19 will push the work piece off the headstock center, and the work will drop slightly into the notches of the indexible work carrier 28. At the same time, of course, the work jack 83 will be withdrawn, the pressure switch 1PS will open and the pressure switch 2PS will close. This results in energization of solenoid SOL$_1$. This solenoid will then shift the valve plunger 342a and connect the pressure port 348 to channel 356. This will cause operation of the work indexing mechanism shown in FIGURES 6 and 7 and a new work piece will be moved into cutting position.

Figures 5, 6, 7:
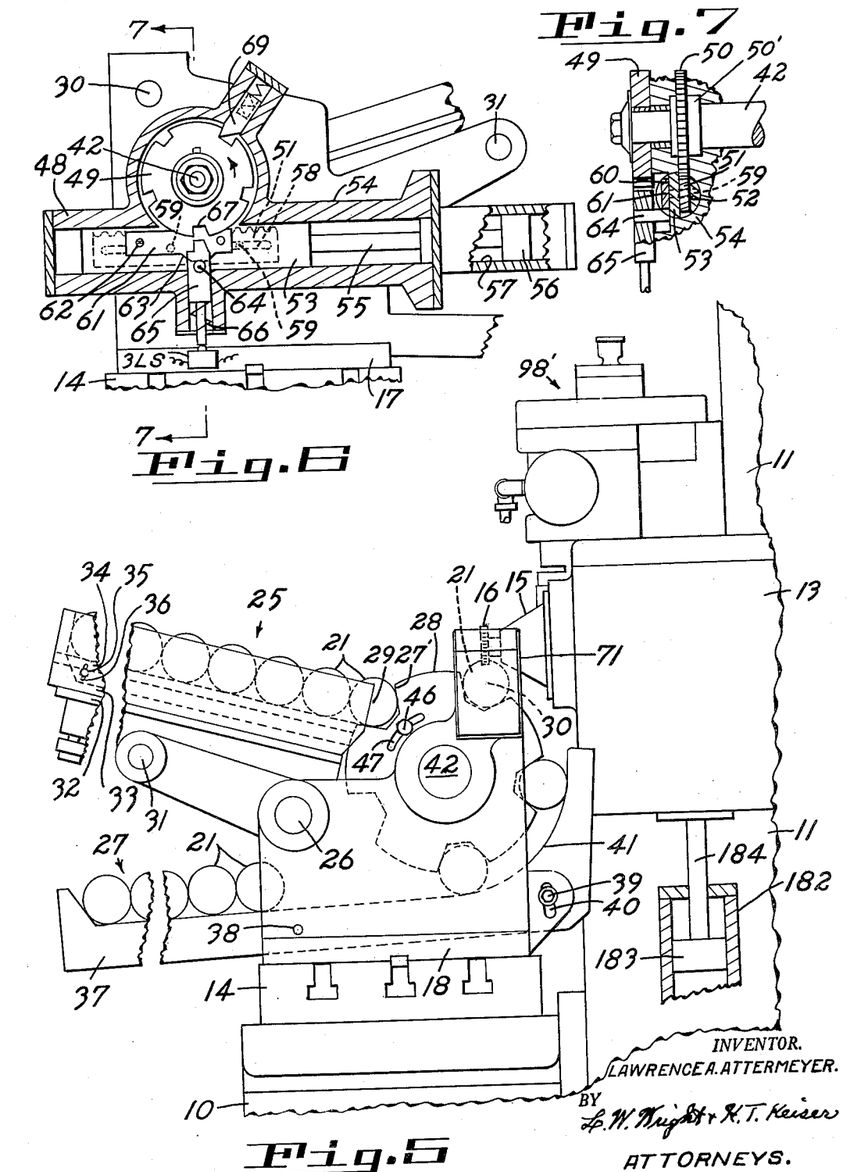
FIGURE 5 is a section on the line 5—5 of FIGURE 1.
FIGURE 6 is a section on the line 6—6 of FIGURE 3.
FIGURE 7 is a detailed section on the line 7—7 of FIGURE 6.

As the locking pawl 65, shown in FIGURE 6, is withdrawn during the indexing operation, it will operate the limit switch LS3, and this will break the circuit to relay 1CR. This immediately deenergizes solenoids SOL$_1$ and SOL$_2$, and they will return to their normal position shown in FIGURE 15 whereby pressure will be admitted to channel 345 to effect the ratcheting stroke of the work indexing mechanism, and admit pressure to channel 351 to effect advance of the tailstock center 20 and operation of limit switch 1PS. This reloading operation goes on while the table is rapid traversing to the right. This rapid traversing was effected by the spindle carrier on its last upward movement by dog 218 actuating the trip plunger 195 to index control shaft 173 which caused the control cams 169 and 170 to produce this result. When the table completes its rapid traverse movement to the right, a control dog actuates one of the trip plungers to effect another indexing of the shaft 173 which, this time, moves the cams to their stop position. However, the table does not stop immediately but overtravels the trip plungers 295 and 299 until the dog 340' actuates the limit switch 4LS. As shown in the electrical diagram, when the limit switch 4LS closes and the pressure switch 1PS is closed, which signals that the next work piece has been properly clamped in the machine, solenoid SOL$_3$ is energized which, as shown in the hydraulic diagram, FIGURE 16, automatically actuates the plunger 281 and thereby energizes the trip plunger 178 to index the shaft 173 to its starting position whereby the next cycle of the machine will be started.

What is claimed is:

1. In a keyway milling machine having a slidable work table and a cutter spindle carrier advanceable toward and retractable from said table, the combination of means to effect alternate movement of the table and carrier, said alternate table movements being unidirectional and comprising alternate cutting and non-cutting strokes and said carrier movements being successively in opposite directions, said means including power operable means to advance said carrier toward said table and means responsive to each of said movements to stop one and start the other in continuous succession to mill a plurality of keyways longitudinally of the workpiece, means to vary the length of the successive advancing strokes of the carrier including an indexible turret mounted on the carrier and having a plurality of stop members thereon, a positive stop engageable by one of said stop members when the spindle carrier is advanced toward the table, power operable means to index said turret a source of power, and means to connect said source of power in parallel to said power operable means for both the carrier and the turret whereby each time the carrier is advanced the turret stop will be indexed.

2. In a keyway milling machine having a slidable work table and a cutter spindle carrier advanceable toward and retractable from said table, the combination of means to effect alternate movement of the table and carrier, said alternate table movements being unidirectional and comprising alternate cutting and non-cutting strokes and said carrier movements being successively in opposite directions, said means including power operable means to advance said carrier forward said take and means responsive to each of said movements to stop one and start the other in continuous succession to mill a plurality of keyways longitudinally of the workpiece, means to vary the length of the successive advancing strokes of the carrier including an indexible turret mounted on the carrier and having a plurality of stop members thereon, a positive stop engageable by one of said stop members when the spindle carrier is advanced toward the table, power operable means to index said turret, a source of power, means to connect said source of power in parallel to said power operable means for both the carrier and the turret whereby each time the carrier is advanced the turret will be indexed, and means operable upon engagement of a turret stop member with said positive stop to initiate the next stroke of the table.

3. In a machine tool having a movable work table and a spindle carrier advanceable toward and retractable from said table, the combination of an automatic cycle mechanism for controlling the movements of the table and carrier, said mechanism including a member movable to a series of different event controlling positions and means for stepping said member from one position to the next to select the different events in the automatic cycle, power operable means to advance the spindle carrier toward the table, means to determine the extent of advance of the spindle carrier toward the work table, said means including an indexible turret having a plurality of adjustable stop members thereon, a positive stop engageable by one of said stop members when the spindle carrier is advanced toward the table, and power operable means for indexing said turret, a source of power, means to connect said source of power in parallel to the power operable means for both the carrier and the turret indexing means to thereby cause the turret to be indexed each time the carrier is advanced toward the table, and means operable upon engagement of a stop member with said positive stop to operate said stepping means and thereby cause said movable member to select the next event in the cycle.

4. In a machine tool having a work table, a spindle carrier, and means for moving the spindle carrier including a reversible fluid motor for advancing the spindle carrier toward the table and for retracting it therefrom, the combination of automatic cycle mechanism for controlling the movements of the table and carrier, said mechanism including a member movable to a series of event controlling positions and means for stepping said member from one position to the next to select the different events in the automatic cycle, means to determine the extent of advance of the spindle carrier toward the work table including an indexible turret having a plurality of adjustable stop members thereon and a positive stop engageable by one of said stop members when the spindle carrier is advanced toward the table, indexing mechanism for advancing said turret from one position to the next position, a reversible fluid motor operable in one direction to give said indexing mechanism a cocking stroke and operable in the opposite direction to give said indexing mechanism an advancing stroke, a source of fluid under pressure, means including a reversing valve, to connect said pressure source to said fluid motors in parallel whereby when said carrier is retracted said indexing mechanism will be cocked and when said carrier is advanced said turret will be advanced, and means operable upon engagement of a stop member with said positive stop to operate said stopping means and thereby cause said movable member to select the next event in the cycle.

5. The machine tool of claim 4 including means to control the extent of movement of the turret on the advancing stroke, said means including a settable abutment element for controlling the length of the cocking stroke of said indexing mechanism.

References Cited in the file of this patent

UNITED STATES PATENTS

| | | |
|---|---|---|
| 1,978,360 | Archea | Oct. 23, 1934 |
| 2,180,771 | Poole | Nov. 21, 1939 |
| 2,217,671 | Coffin et al. | Oct. 15, 1940 |
| 2,267,177 | Twyman | Dec. 23, 1941 |
| 2,365,043 | Blood et al. | Dec. 12, 1944 |
| 2,383,999 | Voity et al. | Sept. 4, 1945 |
| 2,445,433 | Holmstrom | July 20, 1948 |
| 2,571,049 | Meylich | Oct. 9, 1951 |
| 2,589,512 | Rue et al. | Mar. 18, 1952 |
| 2,695,535 | Carman | Nov. 30, 1954 |
| 2,713,772 | Horlacher | July 26, 1955 |
| 2,748,665 | Senn | June 5, 1956 |
| 2,764,067 | Armitage et al. | Sept. 25, 1956 |
| 2,776,584 | Burg | Jan. 8, 1957 |
| 2,870,659 | Burg | Jan. 27, 1959 |
| 2,887,894 | Charlat | May 26, 1959 |

UNITED STATES PATENT OFFICE
CERTIFICATE OF CORRECTION

Patent No. 3,018,696 January 30, 1962

Lawrence A. Attermeyer

It is hereby certified that error appears in the above numbered patent requiring correction and that the said Letters Patent should read as corrected below.

Column 13, line 11, after "turret" insert a comma; line 24, for "forward said take" read -- toward said table --.

Signed and sealed this 29th day of May 1962.

(SEAL)
Attest:

ERNEST W. SWIDER
Attesting Officer

DAVID L. LADD
Commissioner of Paten